United States Patent
Seevers et al.

(10) Patent No.: US 6,260,023 B1
(45) Date of Patent: Jul. 10, 2001

(54) TRANSACTION PROCESSING SYSTEM INCLUDING A NETWORKED PRODUCE RECOGNITION SYSTEM

(75) Inventors: Daniel B. Seevers, Duluth, GA (US); Stephen J. Ames, Rochester; Jeffrey P. Treptau, Golden Valley, both of MN (US); Donald A. Collins, Jr., Lawrenceville, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/333,062

(22) Filed: Jun. 14, 1999

(51) Int. Cl.[7] ............................. G06F 17/60; G06F 15/00
(52) U.S. Cl. ................................ 705/20; 705/23; 235/378
(58) Field of Search ..................... 705/20, 23; 235/378, 235/462.01, 462.11

(56) References Cited

U.S. PATENT DOCUMENTS

| | | | |
|---|---|---|---|
| Re. 35,117 | * 12/1995 | Rando et al. ........................ | 235/375 |
| 5,014,267 | 5/1991 | Tompkins et al. ...................... | 370/62 |
| 5,166,755 | 11/1992 | Gat ........................................ | 356/419 |
| 5,497,314 | * 3/1996 | Novak .................................. | 235/385 |
| 5,546,475 | 8/1996 | Bolle et al. ........................... | 382/190 |
| 5,598,209 | 1/1997 | Cortjens et al. ..................... | 348/211 |
| 5,674,003 | 10/1997 | Anderson et al. ............... | 364/514 R |
| 5,969,317 | * 10/1999 | Espy et al. ............................ | 235/378 |
| 5,978,772 | * 11/1999 | Mold ..................................... | 705/20 |
| 5,987,428 | * 11/1999 | Walter .................................. | 705/23 |
| 6,005,959 | * 12/1999 | Mohan et al. ........................ | 382/110 |
| 6,069,696 | * 5/2000 | McQueen et al. .................... | 356/326 |
| 6,075,594 | * 6/2000 | Thomas et al. ...................... | 356/328 |
| 6,155,489 | * 12/2000 | Collins, Jr. et al. ............ | 235/462.01 |

FOREIGN PATENT DOCUMENTS 1 041 378 * 10/2000 (EP) .

OTHER PUBLICATIONS

Tim Triplett, Scanning wand makes checkout lines disappear, Marketing News v28n14, pp 6–11, Jul. 1994.*
Patents: Checkout scanners may soon be ringing up fruits and vegetables based on their scent, New York Times, p C2, Nov. 3, 1997.*

* cited by examiner

Primary Examiner—Robert P. Olszewski
Assistant Examiner—Bryan Jaketic
(74) Attorney, Agent, or Firm—Paul W. Martin

(57) ABSTRACT

A transaction processing system which includes a produce recognition server for identifying produce items. The produce recognition system further includes a checkout system including a transaction processing terminal, a bar code reader which sends item identification information associated with bar-coded items and with the produce items to the transaction processing terminal, a produce data collector coupled to the bar code reader, and a computer coupled between the bar code reader and the produce recognition server for relaying produce data to the produce recognition server and produce identification information to the bar code reader.

9 Claims, 5 Drawing Sheets

TRANSACTION PROCESSING SYSTEM INCLUDING A NETWORKED PRODUCE RECOGNITION SYSTEM

CROSS-REFERENCE TO RELATED APPLICATIONS

The present invention is related to the following commonly assigned and co-pending U.S. application:

"Item Checkout Device Including A Bar Code Data Collector And A Produce Data Collector", filed Nov. 10, 1998, invented by Collins, and having a Ser. No. 09/189,781.

BACKGROUND OF THE INVENTION

The present invention relates to product checkout systems and more specifically to a transaction processing system which includes a networked produce recognition system.

A typical transaction establishment includes a network of transaction terminals which all obtain price information from a single price file through a transaction server. The price file links item identification information to price information.

The transaction terminals are located at checkout counters, which typically contain bar code readers and which may additionally contain scales, either stand-alone units or integrated with the bar code readers. The bar code readers provide identification information for bar-coded items to the transaction terminals and the scales provide weight information for non-bar-coded items.

Items which are typically not bar-coded and identified by a bar code reader are produce items. Thus, identification of produce items is typically a task for the checkout operator, who must identify a produce item and then manually enter an item identification code. Operator identification methods are slow and inefficient because they typically involve a visual comparison of a produce item with pictures of produce items. Operator identification methods are also prone to error, on the order of fifteen percent.

Therefore, it would be desirable to provide a produce recognition system which can minimize operator involvement in produce identification and entry into a transaction. It would also be desirable to provide a produce recognition system which can be easily added as an upgrade to an existing transaction processing network. Thus, it would be desirable to provide a network-based produce recognition system.

SUMMARY OF THE INVENTION

In accordance with the teachings of the present invention, a transaction processing system including a networked produce recognition system is provided.

The produce recognition system includes a produce recognition server and a checkout system which are networked together. The checkout system includes a transaction processing terminal, a bar code reader which sends item identification information associated with bar-coded items and with the produce items to the transaction processing terminal, a produce data collector coupled to the bar code reader, and a computer coupled between the bar code reader and the produce recognition server for relaying produce data to the produce recognition server and produce identification information to the bar code reader.

A method of recording a produce item as part of a transaction includes recording produce data by a produce data collector, sending the produce data through a communications port in a bar code reader to a produce recognition server with a request for item identification information by the produce data collector, receiving the item identification information from the produce recognition server by the bar code reader, sending the item identification to a transaction processing terminal by the bar code reader, and adding the item identification information to the transaction.

It is a feature of the present invention that the bar code reader sends item identification information for both bar-coded and non-bar-coded items to the transaction processing terminal.

It is accordingly an object of the present invention to provide a transaction processing system including a networked produce recognition system.

It is another object of the present invention to provide a networked produce recognition system which provides item identification information for both bar-coded and non-bar-coded items.

It is another object of the present invention to provide a networked produce recognition system which includes a bar code reader containing control circuitry for processing bar code data collector signals, scale signals, and produce data collector signals.

It is another object of the present invention to provide a produce recognition system in which a produce recognition server is called by the produce data collector through a bar code reader, rather than through a transaction processing terminal.

It is another object of the present invention to provide a produce recognition system which includes a bar code reader which has a secondary communications port for communicating with a produce recognition server.

It is another object of the present invention to provide a produce recognition system which can be easily added to an existing transaction processing network.

It is another object of the present invention to add a produce recognition network to an existing store network.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
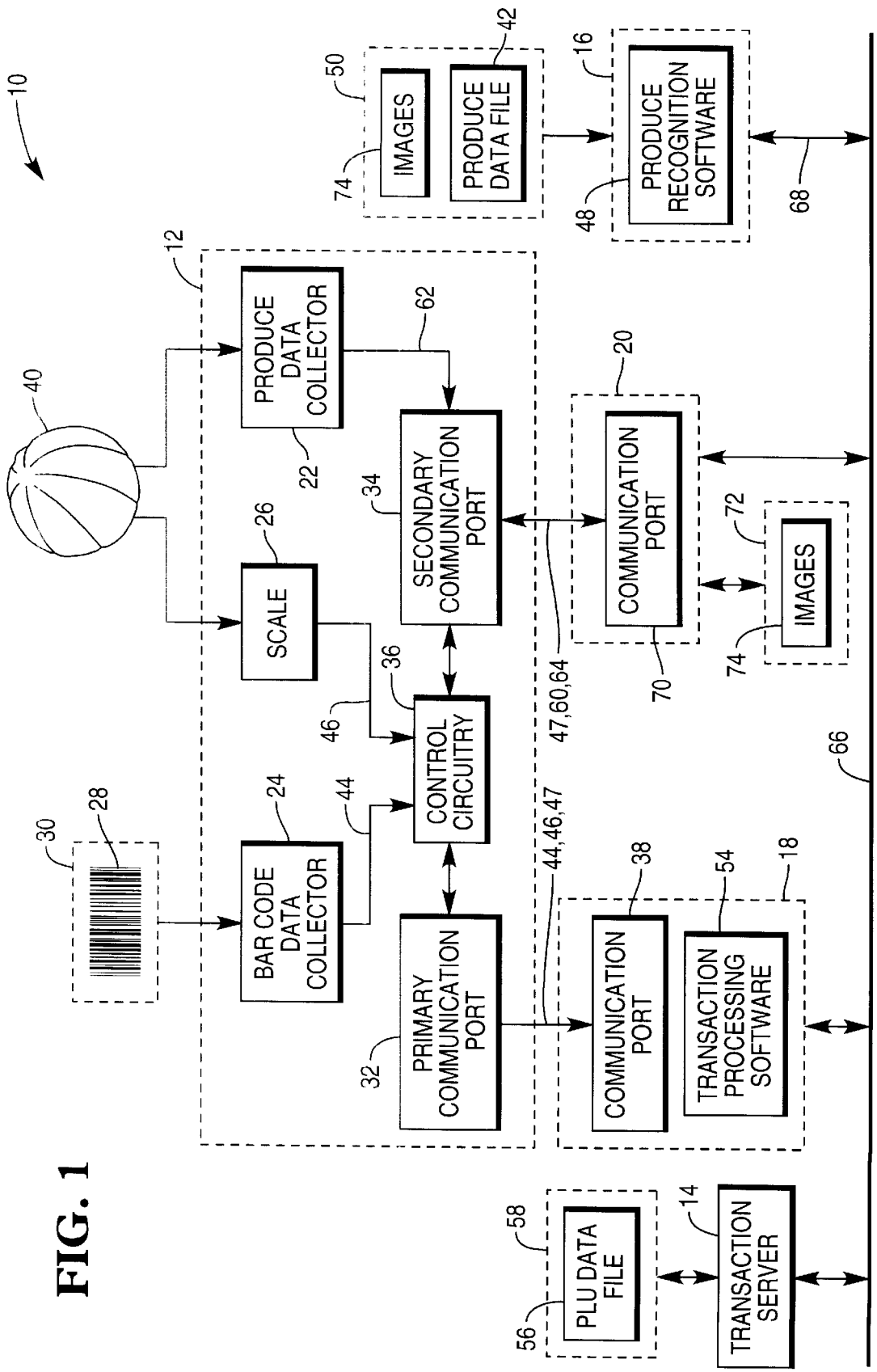
FIG. 1 is a block diagram of a transaction processing system including a networked produce recognition system.

Referring now to FIG. 1, transaction processing system 10 primarily includes item checkout system 12, transaction server 14, produce recognition server 16, transaction terminal 18, and computer 20. Preferably, system 10 includes a plurality of checkout systems 12, transaction terminals 18, and intelligent displays 20 installed within checkout counters in a transaction establishment. Transaction server 14, produce recognition server 16, transaction terminal 18, and computer 20 are coupled to network 66 using a standard network architecture and protocol. An example network architecture envisioned by the present invention is an Ethernet network architecture.

Item checkout system 12 includes produce data collector 22, bar code data collector 24, and scale 26. Item checkout system 12 preferably includes a bar code reader with integral scale, such as the model 7875 optical bar code scanner manufactured by the assignee of the present invention, modified to include produce data collector 22.

Bar code data collector 24 reads bar code 28 on merchandise item 30 to obtain an item identification number, also known as a price look-up (PLU) number, associated with item 30. Bar code data collector 24 may be any bar code data collector, including an optical bar code scanner which uses laser beams to read bar codes. Bar code data collector 24 may be located within a checkout counter or mounted on top of a checkout counter.

Scale 26 determines a weight for produce item 40. Scale 26 sends weight information for produce item 40 to transaction terminal 18 so that transaction terminal 18 can determine a price for produce item 40 based upon the weight information. Scale 26 is preferably integrated into a common housing with bar code data collector 24. Scale 26 may be mounted and designed to operate separately, but, in that case would require a secondary communication port at transaction terminal 18 or an additional free communication port in bar code data collector 24.

Checkout system 12 additionally includes primary communication port 32, secondary communication port 34, and control circuitry 36.

Primary communication port 32 couples to transaction terminal 18 and control circuitry 36. Primary communication port 32 couples to transaction terminal 18 using standard connection methods and protocols, including serial OCIA, RS232, etc.

Secondary communication port 34 couples to produce data collector 22, control circuitry 36, and computer 20. Checkout counter bar code readers typically include at least one secondary communication port for connecting a second bar code data collector, in particular, a hand-held bar code reader. The NCR model 7875 bar code reader includes two secondary communication ports 34. Secondary communication port 34 couples to computer 20 and produce data collector 22 using standard connection methods and protocols, including RS232, TTL, and raw undecoded bar code data. Cable 60 from computer 20 plugs into secondary communication port 34. Cable 62 from produce data collector 22 is hard-wired to secondary communication port 34. Alternatively, cable 60 may be coupled to another secondary communication port 34, if available.

Advantageously, this method requires no software modification in a bar code reader to support produce recognition. Produce data collector 22 may be easily added to an existing checkout system that lacks produce recognition capability. No additional communication ports within transaction terminal 18 need be configured.

Identification information 47 from produce recognition server 16 passes through computer 20, cable 60, and secondary communication port 34, and flows through control circuitry 36 unchanged. Control circuitry 36 treats identification information 47 in the same way it would treat identification information received from a recent hand-held bar code scan.

Control circuitry 36 additionally controls operation of bar code data collector 24 and scale 26. In the case of bar-coded items, control circuitry 36 decodes bar code label 28 and provides item identification information 44 to transaction terminal 18 through primary communication port 32.

In the case of non-bar-coded items, control circuitry 36 sends weight information 46 from scale 26 to transaction terminal 18 through primary communication port 32. Control circuitry 36 receives item identification information 47 from secondary communication port 34 and sends it to transaction terminal 18 through primary communication port 32.

Produce data collector 22 collects data for produce item 40 or any other non-bar-coded merchandise item. Such data may include color and color distribution data, size data, shape data, and aromatic data.

Operation of produce data collector 22 preferably occurs automatically when produce item 40 is placed over produce data collector 22. For example, produce data collector 22 may sense a drop in ambient light or receive a signal from scale 26. Produce data collector 22 sends collected produce data to produce recognition server 16 with a command to analyze the collected produce data.

Produce recognition server 16 executes produce recognition software 48 which obtains produce data 64 from produce data collector 22 via computer 20 and network 64, identifies produce item 40 by comparing produce data in produce data file 42 with collected produce data 64, retrieves corresponding item identification information 47 from produce data file 42, and forwards item identification information 47 to control circuitry 36 in checkout system 12.

To assist in proper identification of produce items, produce recognition software 48 may additionally return a candidate list information 68 of produce items to computer 20 for operator verification. Produce recognition software 48 preferably arranges the candidate produce items in terms of probability of match.

Storage medium 50 stores produce data file 42.

Transaction terminal 18 executes transaction processing software 54 which obtains item identification information from checkout system 12 and corresponding price information from transaction server 14. Transaction processing software 54 calculates a price for produce item 40 by multiplying unit price information from PLU data file 56 with weight information from scale 26. Transaction processing software 54 tallies the price information for all merchandise items, controls payment, causes a receipt to be printed, and performs other standard transaction-related tasks.

Transaction terminal 18 includes communication port 38, which is a standard port, such as an RS232 serial port. Transaction terminal 18 receives item identification information 44, weight information 46, and item identification information 47 from checkout system 12 through communication port 38.

Transaction server 14 obtains item identification information from transaction terminal 18 and returns corresponding price information from PLU data file 56.

PLU data file 56 contains prices for bar-coded items 30 and unit prices for produce items 40. PLU data file 56 is stored within storage medium 58.

Computer 20 provides a network connection for sending produce data to produce recognition server 16 and for receiving item identification information 47 from produce recognition server 16.

Computer 20 preferably includes an intelligent display, which includes a liquid crystal display (LCD) and a built-in motherboard and central processing unit (CPU). As such, computer 20 may additionally include a touch screen for operator input. Computer 20 includes communication port 70, which is a standard port, such as an RS232 serial port. Computer 20 may additionally include a local storage medium 72 for storing images 74 of produce items for display in response to receipt of list information 68 from produce recognition server 16. Images 74 may alternatively be stored in storage medium 50.

Figure 2:
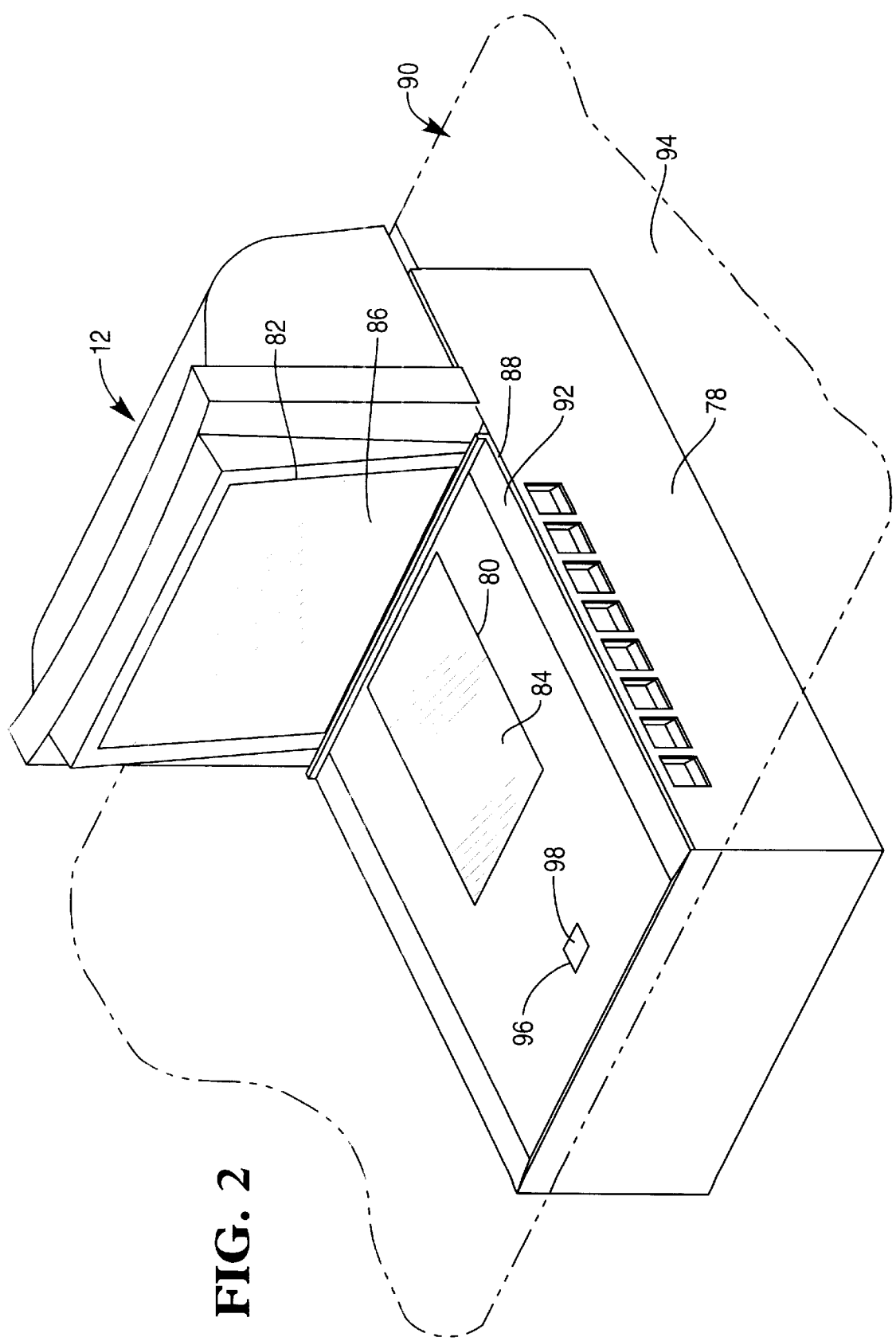
FIG. 2 is a perspective view of an item checkout system containing a produce data collector.
Figure 3:
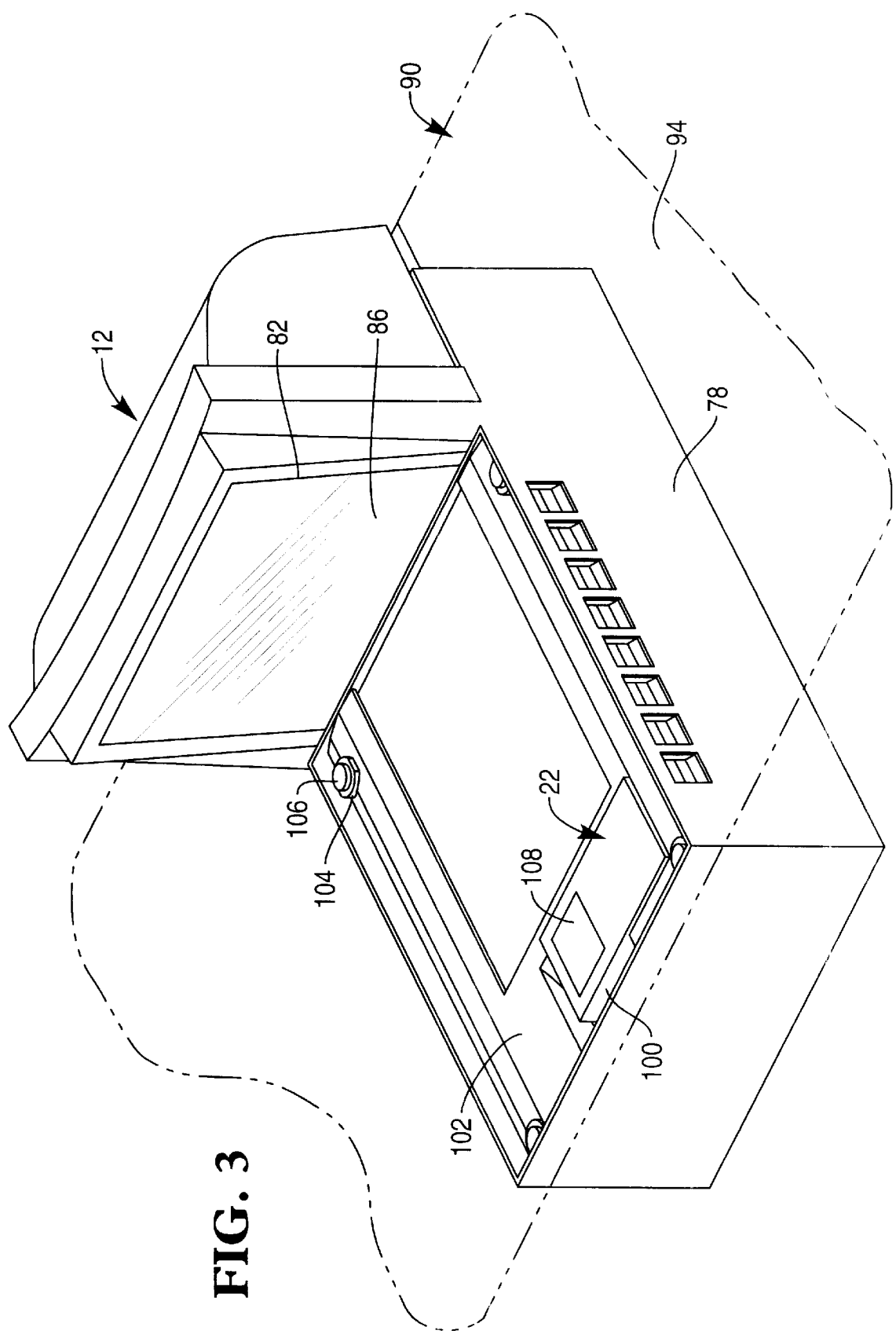
FIG. 3 is a perspective view of the item checkout system showing mounting of a produce data collector.

Turning now to FIGS. 2–3, checkout system 12 is shown in more detail. System 12 includes housing 78, which is adopted from a housing from the NCR model 7875 optical bar code scanner. Housing 78 includes vertical aperture 82. Aperture 82 includes transparent window 86.

Housing 78 is mounted within checkout counter 90 so that top surface 92 of weigh plate 88 is substantially flush with top surface 94 of checkout counter 90. Scale weigh plate 88 includes aperture 80 used by bar code data collector 12 and aperture 96 used by produce data collector 22. Apertures 80 and 96 include transparent windows 84 and 98.

Bar code data collector 24 directs scanning light beams towards bar code label 28 through aperture 80 within scale weigh plate 88 and vertical aperture 82 within housing 78. Reflected light from bar code label 28 passes through apertures 80 and 82.

With reference to FIG. 3, produce data collector 22 is mounted inside housing 78 so as not to obstruct the laser beam produced by bar code data collector 24.

Produce data collector 22 includes housing 100 which is mounted within support frame 102. Produce data collector 22 may additionally include auxiliary window 108.

Support frame 102 fastens to housing 78, but does not obstruct operation of bar code data collector 24 or scale 26. Frame 102 is generally U-shaped so as not to obstruct a laser beam directed towards aperture 80. Frame 102 also includes apertures 104 through which scale support members 106 pass unhindered.

Figure 4:
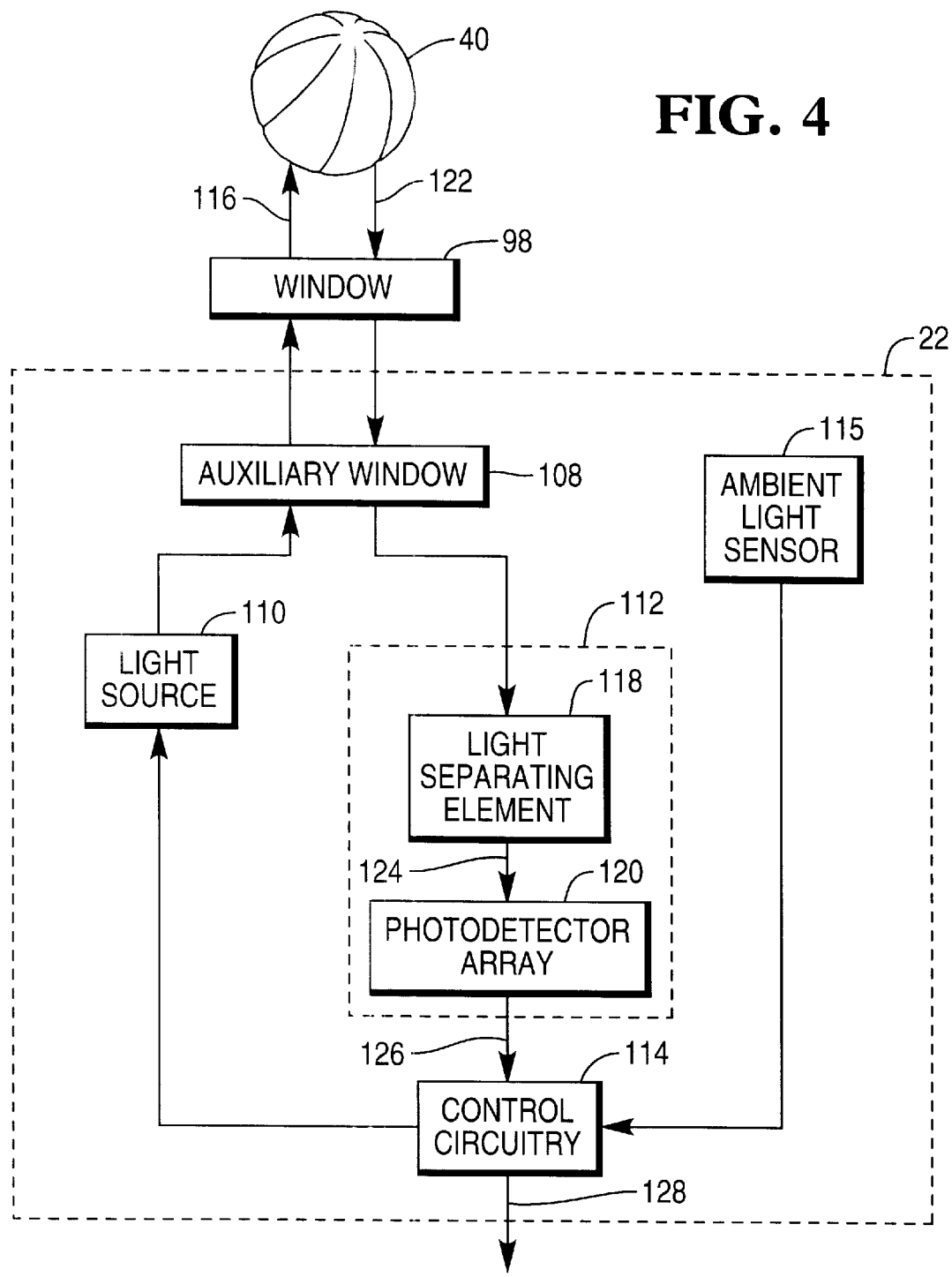
FIG. 4 is a block diagram of the produce data collector.

Turning now to FIG. 4, one type of produce data collector 22 is shown in more detail.

Produce data collector 22 primarily includes light source 110, spectrometer 112, control circuitry 114, and ambient light sensor 115.

Light source 110 produces light 116. Light source 110 preferably produces a white light spectral distribution, and preferably has a range from four hundred 400 nm to 700 nm, which corresponds to the visible wavelength region of light.

Light source 110 preferably includes one or more light emitting diodes (LEDs). A broad-spectrum white light producing LED, such as the one manufactured by Nichia Chemical Industries, Ltd., is preferably employed because of its long life, low power consumption, fast turn-on time, low operating temperature, good directivity. Alternate embodiments may include additional LEDs having different colors in narrower wavelength ranges and which are preferably used in combination with the broad-spectrum white light LED to even out variations in the spectral distribution and supplement the spectrum of the broad-spectrum white light LED.

Spectrometer 112 includes light separating element 118 and photodetector array 120.

Light separating element 118 splits collected light 122 into light 124 of a continuous band of wavelengths. Light separating element 118 is preferably a linear variable filter (LVF), such as the one manufactured Optical Coating Laboratory, Inc., or may be any other functionally equivalent component, such as a prism or a grating.

Photodetector array 120 is coupled to control circuitry 114. Photodetector array 120 produces analog waveform signals 126 containing spectral data. The pixels of photodetector array 120 spatially sample the continuous band of wavelengths produced by light separating element 118, and produce a set of discrete analog signal levels. Photodetector array 120 is preferably a complimentary metal oxide semiconductor (CMOS) array, but could be a Charge Coupled Device (CCD) array.

Control circuitry 114 controls operation of produce data collector 22 and produces digitized produce data waveform signals 128.

Ambient light sensor 115 senses a drop in ambient light. Control circuitry 114 uses a signal from ambient light sensor 115 to initiate produce data collection.

In operation, an operator places produce item 40 on window 98 in weigh plate 88. Light source 110 illuminates produce item 40 with light 116. Light separating element 118 separates reflected light 122 into different wavelengths to produce light 124 of a continuous band of wavelengths. Photodetector array 120 produces analog waveform signals 126. Control circuitry 114 converts analog waveform signals 126 to digital waveform signals 128 and sends them to produce recognition server 16 for identification.

Figure 5:
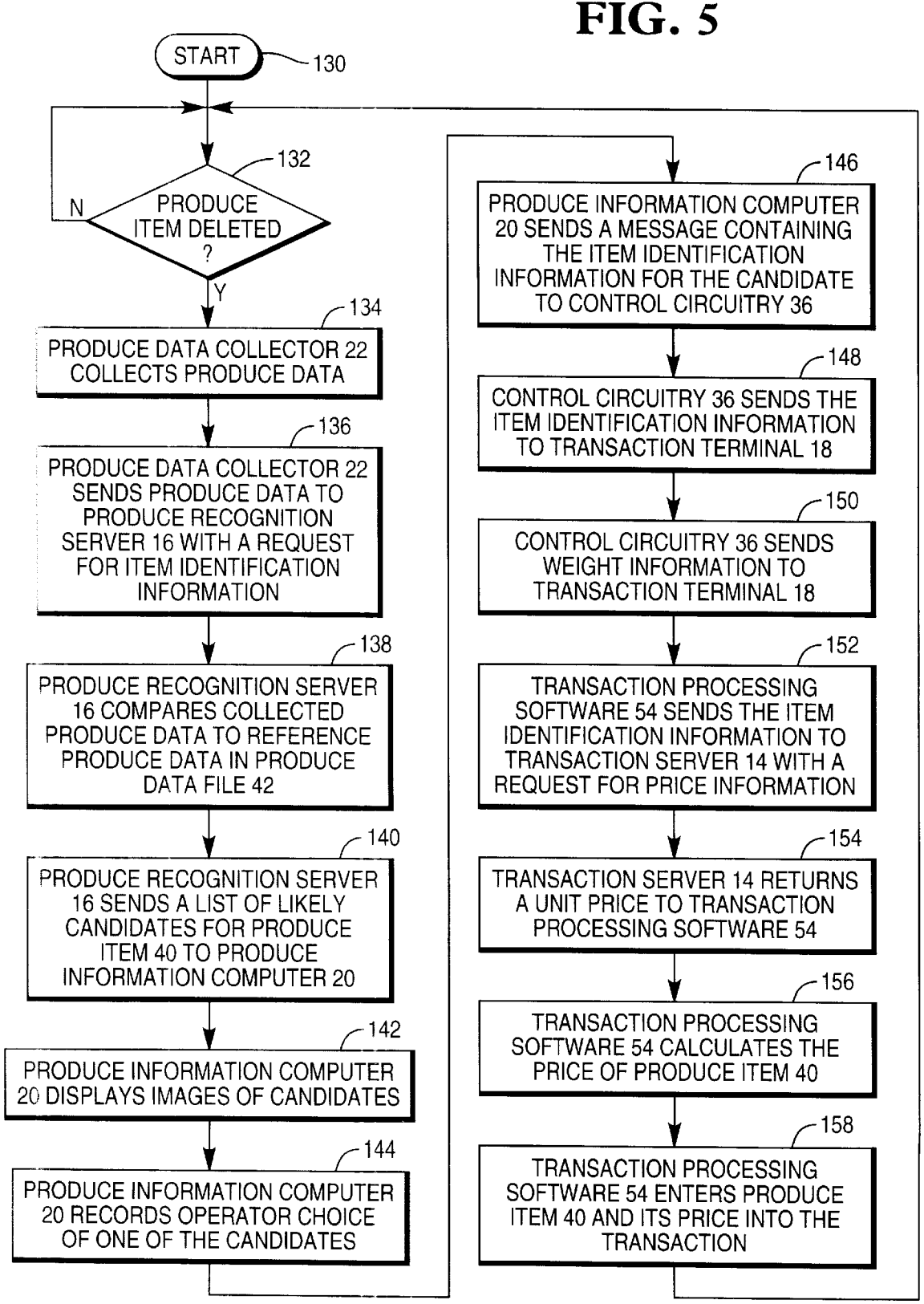
FIG. 5 is a flow chart illustrating how produce items are processed by the transaction processing system.

Turning now to FIG. 5, a method of recording produce items into a transaction using system 10 is illustrated in more detail beginning with start 130.

In step 132, produce data collector 22 waits for produce item 40 to be placed over aperture 96.

In step 134, produce data collector 22 collects produce data after it senses placement of produce item 40 over aperture 96.

In step 136, produce data collector 22 sends produce data to produce recognition server 16 with a request for item identification information.

In step 138, produce recognition server 16 compares collected produce data to reference produce data in produce data file 42 and returns a likely candidate for item identification information 47.

Steps 140–144 are optional and intended for stores in which operator verification of produce item identification information 47 is required.

In step 140, produce recognition server 16 sends a list of candidates including the likely candidate to computer 20.

In step 142, computer 20 displays images of the candidates.

In step 144, computer 20 records an operator choice for one of the candidates.

In step 146, computer 20 sends item identification information 47 to control circuitry 36.

In step 148, control circuitry 36 sends item identification information 47 to transaction terminal 18.

Advantageously, control circuitry 36 treats identification information 47 in the same way it would treat identification information received from bar code data collector 24 or a hand-held bar code reader attached to one of secondary communication ports 34.

In step 150, control circuitry 36 sends weight information from scale 26 to transaction terminal 18.

In step 152, transaction processing software 54 sends the item identification information to transaction server 14 with a price request.

In step 154, transaction server 14 reads PLU data file 56 and returns a unit price to transaction terminal 18.

In step 156, transaction processing software 54 calculates a price for produce item 40 by multiplying the unit price by the weight information.

In step 158, transaction processing software 54 enters produce item 40 and its price into the transaction.

Operation returns to step 132 to wait for another input signal.

Although the invention has been described with particular reference to certain preferred embodiments thereof, variations and modifications of the present invention can be effected within the spirit and scope of the following claims. For example, the fact that transaction processing software 54 may also start produce recognition software 48 in response to an operator-initiated keyboard signal is also envisioned by the present invention.

What is claimed is:

1. A produce recognition system comprising:
    a produce recognition server for identifying produce items; and
    a checkout system networked to the produce recognition server including
        a transaction processing terminal;
        a bar code reader which sends item identification information associated with bar-coded items and with the produce items to the transaction processing terminal;
        a produce data collector coupled to the bar code reader; and
        a computer coupled between the bar code reader and the produce recognition server for relaying produce data to the produce recognition server and produce identification information to the bar code reader.

2. The system as recited in claim 1, further comprising:
    a transaction server which provides prices and unit prices to the transaction processing terminal.

3. The system as recited in claim 1, further comprising:
    a scale coupled to the bar code reader for weighing the produce items.

4. The system as recited in claim 3, wherein the bar code reader comprises:
    a bar code data collector;
    control circuitry which receives bar code signals from the bar code data collector and scale signals from the scale;
    a first communication port coupled between the control circuitry and the transaction processing terminal; and
    a second communication port coupled between the control circuitry and the produce data collector and coupled to the computer.

5. The system as recited in claim 1, wherein the computer displays an image of a produce item associated with the item identification information relayed by the produce recognition server.

6. A method of recording a produce item as part of a transaction comprising:
    (a) recording produce data by a produce data collector;
    (b) sending the produce data through a communications port in a bar code reader to a produce recognition server with a request for item identification information by the produce data collector;
    (c) receiving the item identification information from the produce recognition server by the bar code reader;
    (d) sending the item identification to a transaction processing terminal by the bar code reader; and
    (e) adding the item identification information to the transaction.

7. The method as recited in claim 6, further comprising:
    (f) recording a weight of the produce item by a scale coupled to the bar code reader;
    (g) determining a unit price for the produce item using the item identification information; and
    (h) determining a total price for the produce item using the weight and the unit price.

8. The method as recited in claim 6, wherein element (b) comprises:
    (b-1) sending the produce data through the communications port in the bar code reader to a computer; and
    (b-2) sending the produce data to the produce recognition server by the computer.

9. The method as recited in claim 8, wherein element (c) comprises:
    (c-1) receiving the item identification information from the produce recognition server by the computer; and
    (c-2) sending the item identification information to the bar code reader by the computer.

* * * * *